Dec. 7, 1937. A. H. OELKERS 2,101,650
INBOARD ROLLER BEARING UNIT
Filed Dec. 15, 1934 2 Sheets—Sheet 1
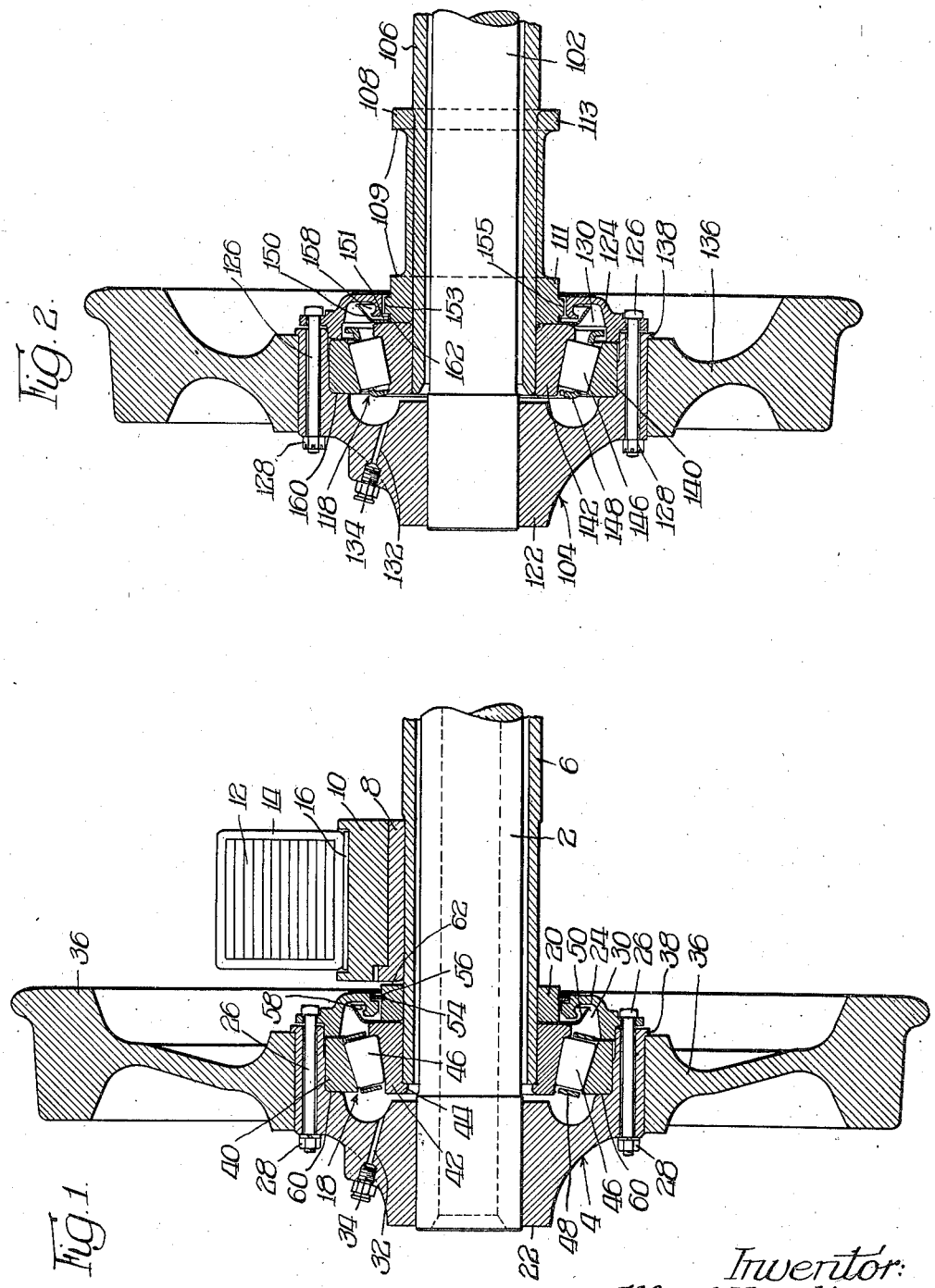
Inventor:
Alfred H. Oelkers,

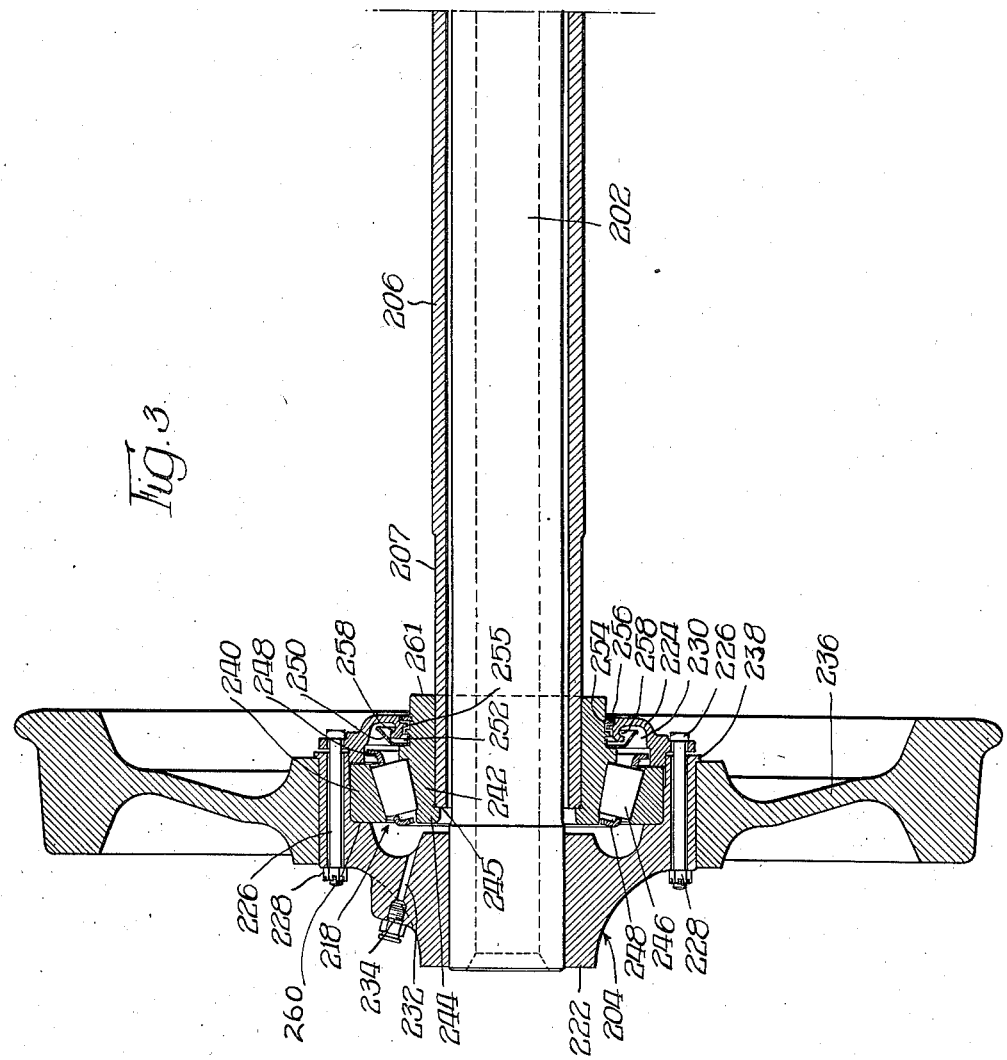

Patented Dec. 7, 1937

2,101,650

UNITED STATES PATENT OFFICE 2,101,650

INBOARD ROLLER BEARING UNIT

Alfred H. Oelkers, Chicago, Ill., assignor to American Steel Foundries, Chicago, Ill., a corporation of New Jersey Application December 15, 1934, Serial No. 757,597

12 Claims. (Cl. 295—36)

This invention relates in general to wheel and axle assemblies and more particularly to a roller bearing wheel and axle assembly of the so-called inboard type in which the load is carried upon the axles at points intermediate the wheels.

One object of the invention is to provide a novel wheel and axle assembly which is adapted for use in existing cars or locomotives of the inboard type.

The invention is contemplated to be used in existing car or locomotive trucks of the inboard type and is so designed that such existing trucks may be converted without other structural changes.

A further object of the invention is to eliminate a great deal of the labor and expense at present involved in the maintenance of such inboard trucks due to excessive wear between rubbing parts.

The invention further contemplates roller bearings carried within the plane of the wheels whereby the loads are transferred directly through the wheel to the rail. This arrangement provides a short overhang between the point of load application from the car body to the axle and the point at which the load is carried on the rail.

Yet another object of the invention is to provide a roller bearing truck of the inboard type in which bearing adjustment will be secured when the wheel is shrunk on the axle.

Another object of the present invention is to provide a novel form of anti-friction wheel and axle assembly having an inner and outer axle in which lateral thrusts will be transmitted from a load carrying member directly through a bearer sleeved on one axle to the bearing and the wheel.

Yet another object of the present invention is to provide a novel form of anti-friction wheel and axle assembly of a type having an inner rotary axle and an outer normally stationary axle wherein lateral thrusts will be transmitted from a load carrying member directly to said bearing through one of the race members thereof.

In the drawings which illustrate embodiments of the invention and wherein like reference characters are used to designate like parts—

Figure 1 is a cross sectional view of one form of wheel and axle assembly embodying the invention;

Figure 2 is a cross sectional view of another wheel and axle assembly embodying the present invention; and Figure 3 is a view in cross section of another form of wheel and axle assembly embodying the present invention.

Referring now more in detail to the drawings, the embodiment disclosed in Figure 1 will first be described. It will be understood, of course, that the construction is the same for both sides of the wheel and axle assembly and therefore only one-half of each embodiment is shown in the drawings. In this embodiment the inner axle 2 has mounted upon its ends the wheels generally designated 4. The inner axle 2 may be solid if designed to carry very heavy loads or tubular, as shown in this embodiment, if designed for light loads. The outer axle or housing member 6 is of straight tubular design and may be of standard commercial shape. The ends of the outer axle may be machined to provide a smooth bearing portion for the journal bearer or brass 8 which receives the load of the super-imposed journal box seating portion 10 mounted thereon. The truck frame (not shown) may be carried on elliptic springs generally indicated at 12 secured by a spring band 14 and resting upon the journal box seating portion 10 through the medium of shim or wear plate 16.

The machined end portion of the outer axle will include that part which receives the roller bearing generally indicated at 18 as well as the sleeve or collar 20 which may be shrunk or pressed on as desired. The wheel 4 is shown as having a hub portion 22 which may be pressed on the ends of the inner axle 2 and is provided with a cavity within which the bearing 18 may be received. This cavity may be sealed by the closure plate 24 which is secured to the hub portion 22 by means of a series of bolts 26 and lock nuts 28. The lubricant recess 30 thus formed may be filled from the outside of the assembly through the duct 32 which may be closed by the plug 34. The outer wheel portion 36 may be secured upon the hub portion 22 as by a press fit and positioned thereupon by the shoulder 38 forming an integral part of the hub portion. The bearing generally indicated by the numeral 18 includes the outer raceway member or cup 40 which is received within the bearing recess of the hub portion as by a press fit; the inner race member 42 which may be pressed upon the end of the outer axle and positioned thereon by the integral shoulder 44 abutting against the end of the outer axle; a series of rollers 46 having the general shape of a frustum of a right cone; and the cage 48 serving as a retainer for the rollers.

Abutting the inner end of the cone is the lubricant deflector 50 held in place between the cone and the sleeve or collar 20. The sleeve 20 is provided with an annular groove 54 within which the snap ring 56 may be secured to prevent the ingress of dirt and moisture between said collar and the closure plate 24. The closure plate 24 is provided with an annular groove 58 which together with the lubricant deflector 50 acts to retain the lubricant.

It will be observed that the inner race member or cone of the bearing is positioned upon the outer axle by the abutment of the shoulder 44 against the end of said axle. Since the outer face of the outer race member or cup abuts against the shoulder of the hub portion 22 as at 60, adjustment of the bearings may be effected at the time the wheels are pressed upon the inner axle, and said adjustment will be retained until the wheels are removed from the inner axle. It may be further noted that the outer wheel portions 36 may be removed and replaced, as will normally be necessary because of tread wear, without disturbing the position of the hub portion 22 upon the inner axle.

It is to be observed that the journal bearer 8 will normally be some anti-friction material such as brass and it will therefore be slidable upon the normally stationary outer axle as lateral thrusts may require. In such movement the journal bearer 8 will abut against the collar 20 as at 62 and the lateral thrust will be transmitted to the rail through the outer axle, the bearing proper, the wheel and wheel flange.

The embodiment of this invention disclosed in Figure 2 is generally similar to that shown in Figure 1 with exceptions which will be noted.

The inner axle 102 has wheels 104 mounted upon its ends. The outer axle 106 is of tubular form and may be of commercial shape as that described in the embodiment shown in Figure 1. The end portions of the outer axle 106 may be machined to provide a smooth fit for the sleeved bearer 108 designed to be pressed or shrunk on the outer axle as may be desired. This sleeved bearer 108 has a wide annular groove 109 defined by the annular shoulders 111 and 113 within which will be received a brass bearer of the usual standard design, thus receiving vertical load and thrusts from the car body through the medium of a truck frame and journal box assembly (not shown).

The roller bearing assembly generally designated as 118 is received within a recess of the wheel hub portion 122 and the recess may be sealed by the closure plate 124 which is secured to the hub portion 122 by a series of bolts 126 and associated lock nuts 128. Access to the lubricant cavity 130 thus formed is provided through the duct 132 which may be closed by the plug or fitting 134. The outer wheel portion 136 may be pressed upon the hub portion 122 as by a press fit and positioned thereon by the integral shoulder 138.

The bearing 118 includes the outer race or cup 140 which may be pressed within the wheel hub portion; the inner race member or cone 142 which is mounted upon the outer axle 106 and positioned thereon by abutment against the sleeved bearer 108; and a series of rollers 146 held in position by the cage or retainer member 148.

The lubricant deflector 150 may be snapped into position in the groove 151 formed between the inner face of the cone 142 and the annular shoulder 153 of the sleeved bearer 108. An annular inner groove 158 of the closure plate 124 acts together with the deflector 150 and the labyrinth passage 155 to retain the lubricant and prevent the ingress of foreign matter.

This modification differs from that shown in Figure 1 in that the sleeved bearer 108 is used in place of the bearer 8 and the collar 20 of the modification shown in Figure 1. In the modification of Figure 2 the inner face of the cone 142 abuts against the outer face of the sleeved bearer 108 as at 162 and is positioned thereby. The outer race or cone 140 is positioned by the abutment of its outer face against the shoulder of the wheel hub piece as at 160. It will be obvious therefore that adjustment of the bearing will be effected at the time the wheel hub portion is pressed on the inner axle 102.

In this embodiment lateral thrusts will be transmitted from the car body through sleeved bearer 108 and transmitted to the rail through the outer axle 106, the bearing proper 118, the wheel and the wheel flange. Thrusts in both directions will be transmitted by the sleeved bearers 108 on each end of the outer axle 106.

For the purposes of actual operation the outer axle 106, the sleeved bearer 108 and the cone portion 142 of the bearing act as a single integral member.

The modification shown in Figure 3 has a structure generally similar to that shown in Figures 1 and 2 with detail variations which will be noted.

Wheels generally designated 204 are mounted upon the ends of the inner axle 202. The outer axle 206 may be machined at its ends to provide a smooth fit as at 207 for the reception of a bearer or load carrying member similar to the brass 8 shown in Figure 1, thereby supporting the weight of a car body through the medium of any usual design of truck frame and spring suspension.

The bearing assembly generally designated as 218 is received within the cavity of the wheel hub portion 222 and the said cavity may be sealed by the closure plate 224 which is secured to the wheel hub portion by a series of bolts 226 and associated lock nuts 228. This cavity 230 serves as a lubricant chamber and access is provided thereto through the duct 232 which may be closed by the plug or fitting 234.

The outer wheel portion 236 may be pressed upon the hub portion and positioned thereon against the integral shoulder 238.

The bearing 218 comprises an outer race member or cup 240; an inner race or cone 242 having the integral annular shoulder 244 abutting against the end of the outer axle 206 as at 245; and a series of rollers 246 retained by the cage 248. The lubricant deflector 250 is of the design described in Hedgcock Patent No. 1,975,640, Serial No. 478,124, and may be snapped into position in the annular groove 252 formed on the outer circumference of the cone member 240. The spring ring 256 may likewise be snapped into position in the annular groove 254 similarly formed on the outer periphery of the cone member 240. These parts together with the annular flange 255 and the annular groove 258 formed on the inner periphery of the closure plate 224 provide a labyrinth passage which acts to retain the lubricant within its cavity and to prevent the ingress of foreign matter. Since the cone member 240 of the bearing 218 abuts against the shoulder of the wheel hub member 222 as at 260 and the integral shoulder 244 of the cone member 242 abuts against the end of the outer axle as at 245, it is obvious that when the wheels 204 are pressed upon the inner axle 202 a bearing adjustment will be effected which will be retained as long as the wheel hub portion 222 remains fitted upon the inner axle 202. It is likewise apparent that the outer wheel portion 236 may be pressed off of the hub portion 222 and replaced by another outer wheel portion as often as may be desirable because of normal wheel tread wear.

In this modification lateral thrusts from a load carrying member such as the brass 8 of Figure 1 will be received against the inner end of the cone member 242 as at 261 and transmitted to the rail through the outer axle, the bearing proper, the wheel and the wheel flange.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a wheel and axle assembly a rotary axle, a wheel fixed thereon, a normally non-rotary axle, a single course anti-friction bearing mounted on said non-rotary axle and comprising a cup race mounted within said wheel and a cone race sleeved on said non-rotary axle, said cone race comprising an integral shoulder abutting the end of said non-rotary axle and integral means extending inwardly of said wheel for abutment of the load carrying member.

2. In a wheel and axle assembly the combination of an inner axle, an outer axle, a wheel mounted on said inner axle, an anti-friction raceway mounted on said outer axle and comprising integral means abutting the end of said outer axle and other integral means extending inwardly of the vertical plane defining said wheel for abutment of a load carrying member.

3. In an anti-friction wheel and axle assembly the combination of an inner rotary axle, an outer normally non-rotary axle, a single course anti-friction bearing comprising an inner race sleeved on said outer axle and having an integral annular shoulder abutting the end of said outer axle and other integral means for abutment of a load carrying member.

4. In a wheel and axle assembly the combination of an inner axle, an outer axle, a wheel mounted on said inner axle, a single course anti-friction bearing mounted within the plane of said wheel and comprising an inner raceway mounted on said outer axle, an outer raceway mounted within said wheel, rollers therebetween, a load carrying member supported on said outer axle, abutment means integral with said inner raceway preventing inward movement thereof, and means transmitting lateral thrusts from said load carrying member directly to said inner raceway.

5. In a wheel and axle assembly the combination of an inner axle, an outer axle, a wheel mounted on said inner axle, a single course anti-friction bearing mounted on the end of said outer axle within the plane of said wheel and comprising a cone having integral means abutting the end of said axle, a load carrying member supported on said outer axle, and means providing abutment between said load carrying member and said cone.

6. In a wheel and axle assembly the combination of an inner axle, an outer axle, a wheel mounted on said inner axle, a single course anti-friction bearing mounted on said outer axle within the plane of said wheel and comprising a cone race having integral means abutting the end of said outer axle, a load carrying member supported on said outer axle, and means integrally formed with said cone extending outwardly of the plane of said wheel for abutment with said load carrying member.

7. In a wheel and axle assembly the combination of an inner axle, an outer axle, a wheel mounted on said inner axle, a single course anti-friction bearing mounted on said outer axle and comprising a race member having integral means in abutment with the end of said outer axle, a load carrying member supported on said outer axle, and means integral with one of said members providing abutment with the other of said members.

8. In a wheel and axle assembly the combination of an inner axle, an outer axle, a wheel mounted on said inner axle, a single course anti-friction bearing mounted on the end of said outer axle within the plane of said wheel and comprising a race member mounted on the end of said outer axle, a load carrying member slidably supported on said outer axle, and integral means on one of said members abutting the other of said members, whereby lateral thrusts are transmitted from said load carrying member directly through said bearing to said wheel.

9. In a wheel and axle assembly the combination of an inner axle, an outer axle, a wheel mounted on said inner axle, a single course anti-friction bearing mounted on said outer axle within the plane of said wheel and comprising a race member having integral means in abutment with the end of said outer axle, a load carrying member slidably supported on said outer axle, and means integral with one of said members providing abutment for the other of said members, whereby lateral thrusts are transmitted directly from said load carrying member to said bearing.

10. In a wheel and axle assembly for a railway car truck the combination of an inner axle, a wheel mounted on the end thereof, an outer axle, a single course anti-friction bearing comprising a race member mounted on the end of said outer axle within the plane of said wheel, a load carrying member slidably supported adjacent the end of said outer axle, abutment means integrally formed with one of said members for transmitting lateral thrusts between said members, and other abutment means integrally formed on said race member for transmitting lateral thrusts therefrom to the end of said outer axle.

11. In a wheel and axle assembly for a railway car truck the combination of an inner axle, a wheel mounted on the end thereof, an outer axle, a single course anti-friction bearing mounted on the end of said outer axle within the plane of said wheel, a load carrying member slidably supoprted adjacent the end of said outer axle, abutment means transmitting lateral thrusts directly from said load carrying member to said bearing, and other means formed on said bearings for abutment against the end of said outer axle.

12. In a wheel and axle assembly the combination of an inner axle, wheels fixed thereon, an outer axle, single course anti-friction bearings mounted thereon within the planes of said wheels and comprising thrust means abutting the ends of said outer axle, load carrying members slidably supported on the said outer axle adjacent the ends thereof, and other means integral with said bearings respectively extending beyond the planes of said wheels for abutment of said load carrying members.

ALFRED H. OELKERS.